Patented Dec. 4, 1934

1,983,240

UNITED STATES PATENT OFFICE 1,983,240

ALKALI METAL DI-AMYLDITHIOCAR-BAMATES

John F. Olin, Dayton, Ohio, assignor to The Sharples Solvents Corporation, Philadelphia, Pa., a corporation of Delaware No Drawing. Application May 14, 1931, Serial No. 537,482

3 Claims. (Cl. 260—112)

This invention relates to new chemical substances, alkali metal mono-amyldithiocarbamates and alkali metal di-amyldithiocarbamates, and to a method of making them.

In accordance with this invention these substances may be prepared from mono- and di-amylamines derived from a mixture of amyl chlorides resulting from chlorination of pentanes such as are found in gasoline produced from natural gas, when the chlorination is effected by subjecting to heat in the absence of actinic light and in the absence of silent electric discharge a mixture of chlorine and such pentanes in vapor phase, as described in United States Patents No. 1,741,393 and No. 1,717,136 to Ayres. In such chlorination 15 parts by volume of vapors of pentane separated by rectification from natural gas are mixed with one part by volume of chlorine vapor; the mixture is passed at 75 lbs. gauge pressure through an externally heated metallic reactor in which it is heated to 280° C. for sufficient time to effect complete combination of the chlorine; the products of reaction are cooled; and by rectification the resulting amyl chlorides are separated from unchlorinated pentanes.

A typical specimen of the resulting mixed amyl chlorides has the following composition:

| | Per cent |
|---|---|
| 1-chlorpentane $CH_3—CH_2—CH_2—CH_2—CH_2Cl$ | 25 |
| 2-chlorpentane $CH_3—CH_2—CH_2—CHCl—CH_3$ | 17 |
| 3-chlorpentane $CH_3—CH_2—CHCl—CH_2—CH_3$ | 8.3 |
| 1-chlor-3-methyl butane $\begin{matrix}CH_3\\ \phantom{CH}\end{matrix}\!\!\!\!\!CH—CH_2—CH_2Cl$ | 12.4 |
| 2-chlor-3-methyl butane $\begin{matrix}CH_3\\ CH_3\end{matrix}\!\!\!\!\!CH—CHCl—CH_3$ | 8.3 |
| 1-chlor-2-methyl butane $\begin{matrix}CH_3\\ CH_3Cl\end{matrix}\!\!\!\!\!CH—CH_2—CH_3$ | 25 |
| 2-chlor-2-methyl butane $\begin{matrix}CH_3\\ CH_3\end{matrix}\!\!\!\!\!CCl—CH_2—CH_3$ | 4 |

The production from such mixed chlorides of mixed amyl amines having corresponding isomeric amyl radicals can be effected as described in my copending application filed concurrently herewith, Serial No. 537,481 for Process of making amines and di-amines and products of said process, wherein is described means for reacting amyl chlorides, for example, with ammonia to form amylamines. Moreover, in said application means are shown whereby the making of amyl amines can be controlled so as to favor the production of mono- and di-amylamines and for minimizing the production of tri-amylamines.

In the practice of the process of the application referred to above, an isomeric mixture of mono-amylamines may be produced by treating the amyl chloride isomers with a great excess of ammonia, (e. g., six to ten times the theoretical molecular quantity). When smaller quantities of ammonia are used, considerable quantities of the di-amylamines are formed and if still smaller quantities are used the product will contain a large proportion of tri-amylamines. In the practice of this process best results are obtained by the use of a common solvent for the ammonia and amyl chloride, alcohol being preferred for this purpose. It is convenient to use a solution of ammonia in 50% alcohol, such a mixture being obtainable by mixing equal volumes of 95% alcohol and 28% ammonia.

The preparation of the chemical compounds potassium (or sodium) mono-amyldithiocarbamates, for example, may be illustrated as follows:

A mixture of 80 grams of carbon disulphide and 56 grams of potassium hydroxide (or 40 grams of sodium hydroxide) in 200 cc. of water is added to 87 grams of mono-amylamine. Since considerable heat is given off during this operation, the mixture is cooled. It is also agitated to afford good mixing. As the reaction goes on, the mixture changes from colorless to yellow, then becoming orange and finally a dark amber color. The reactions believed to be involved (using potassium as an example) are

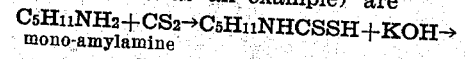
mono-amylamine

potassium mono-amyldithiocarbamate

The mixture is then shaken with charcoal and filtered, whereupon it appears as a clear amber fluid. It is to be understood that the charcoal plays no part in the reaction and only improves the appearance of the mixture.

The excess of carbon disulphide can be withdrawn from the mixture of dithiocarbamate by warming in a vacuum. The water which remains can also be withdrawn in a similar manner, if so desired, and leave the potassium (or sodium) mono-amyldithiocarbamate as a pasty solid.

By way of further illustration, potassium (or sodium) di-amyldithiocarbamate, for example, may be prepared in a manner similar to that above described except that di-amylamine is used instead of the mono-amylamine.

57 grams of di-amylamine may be treated with 56 grams of potassium hydroxide (or 40 grams of sodium hydroxide) and with 80 grams of carbon disulphide in 125 cc. of water. Upon cooling and agitation as in the previous case the potassium (or sodium) di-amyldithiocarbamate is obtained, from which the carbon disulphide and water can be removed by warming in a vacuum. The compound thus obtained is a thin waxy substance resembling vaseline. The reactions involved are believed to be (using potassium as an example)

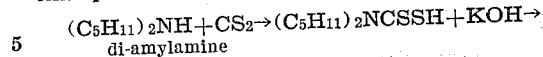
di-amylamine

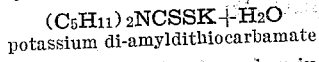
potassium di-amyldithiocarbamate

Since the amyl radicals occurring in the alkali metal mono-amyldithiocarbamates and di-amyldithiocarbamates made according to this invention have been found to correspond to isomeric amyl radicals occurring in the mixture of amyl chlorides above mentioned, products can be made in the practice of this invention which have amyl radicals corresponding to the following formulæ:

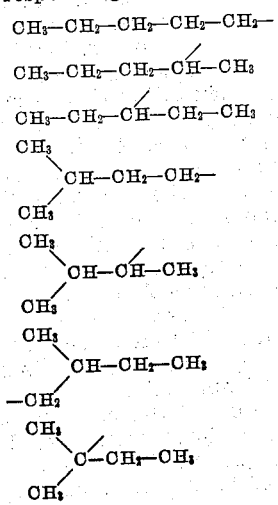

From the foregoing it is apparent that products can be made in the practice of this invention containing amyl radicals, e. g. primary normal and secondary normal amyl radicals, which could not occur in amyldithiocarbamates which might be derived from fusel oil.

The potassium (or sodium) mono-amyldithiocarbamates and the potassium (or sodium) di-amyldithiocarbamates form precipitates with heavy metals and are highly useful and effective as flotation agents.

It is to be understood that other alkali metal mono-amyl and di-amyl dithiocarbamates than those of sodium and potassium may be used according to this invention. The above described methods are illustrative merely and can be modified considerably without departing from the scope of this invention.

I claim:
1. A chemical compound consisting of an alkali metal salt of di-amyldithiocarbamic acid.
2. A chemical compound consisting of a sodium salt of di-amyldithiocarbamic acid.
3. A chemical compound consisting of a potassium salt of di-amyldithiocarbamic acid.

JOHN F. OLIN.

Certificate of Correction

Patent No. 1,983,240. December 4, 1934.

JOHN F. OLIN

It is hereby certified that error appears in the printed specification of the above numbered patent requiring correction as follows: Page 1, line 94, strike out the formula and insert instead $C_5H_{11}NHCSSK+H_2O$; and that the said Letters Patent should be read with this correction therein that the same may conform to the record of the case in the Patent Office.

Signed and sealed this 9th day of July, A. D. 1935.

[SEAL]

BRYAN M. BATTEY,
*Acting Commissioner of Patents.*